(12) United States Patent
Perez

(10) Patent No.: US 9,861,902 B1
(45) Date of Patent: Jan. 9, 2018

(54) EDIBLE SPINNING DEVICE AND METHOD OF OPERATION

(71) Applicant: Rolando Perez, Miramar, FL (US)

(72) Inventor: Rolando Perez, Miramar, FL (US)

( * ) Notice: Subject to any disclaimer, the term of this patent is extended or adjusted under 35 U.S.C. 154(b) by 0 days.

(21) Appl. No.: 15/204,025

(22) Filed: Jul. 7, 2016

(51) Int. Cl.
*A63H 1/00* (2006.01)
*A63H 1/32* (2006.01)

(52) U.S. Cl.
CPC ..................... *A63H 1/32* (2013.01)

(58) Field of Classification Search
USPC ........................................................ D21/463
See application file for complete search history.

(56) References Cited

U.S. PATENT DOCUMENTS

| | | | | | |
|---|---|---|---|---|---|
| 1,258,464 | A | * | 3/1918 | Riley | A63H 3/52 446/254 |
| 1,443,083 | A | * | 1/1923 | Mercier | A45C 1/12 232/4 R |
| 1,513,773 | A | * | 11/1924 | Thompson | A63B 67/10 473/576 |
| 2,106,097 | A | * | 1/1938 | Homan | A23G 3/50 426/104 |
| 2,308,524 | A | * | 1/1943 | Longnecker | A63H 17/02 446/4 |
| 2,312,381 | A | * | 3/1943 | Bickenheuser | A61J 3/10 424/44 |
| 2,330,363 | A | * | 9/1943 | Kaziska | A45C 1/12 232/4 R |
| 2,903,365 | A | * | 9/1959 | O'Brian | A23G 3/50 426/103 |
| 3,058,261 | A | * | 10/1962 | Lakin | A63H 33/005 446/270 |
| D215,553 | S | * | 10/1969 | Houghton et al. | D21/463 |
| 3,687,452 | A | * | 8/1972 | Thompson | A63B 43/00 273/317 |
| 3,724,121 | A | * | 4/1973 | Atkins | A63H 1/30 446/250 |
| 4,189,862 | A | * | 2/1980 | Lopez | A63H 1/32 446/254 |
| 4,232,475 | A | * | 11/1980 | Bauer | A63H 1/32 446/214 |
| 4,986,790 | A | * | 1/1991 | Boury | A63H 1/32 446/219 |

(Continued)

*Primary Examiner* — Aarti B Berdichevsky
*Assistant Examiner* — Urszula M Cegielnik
(74) *Attorney, Agent, or Firm* — Ruben Alcoba, Esq.

(57) ABSTRACT

An edible spinning device and method of operation provides: a spinning toy; a container; and an edible component for consumption. An outer sphere contains the candy and medicine. The outer sphere separates into a first sphere portion and a second sphere portion. An edible member having a pair of diametrically opposed depressions positions between the first sphere portion and the second sphere portion. A first cord extends along an axis between the first sphere portion and the edible member. A second cord extends along the axis between the second sphere portion and the edible member. Moving the first sphere portion away from the second sphere portion increases torque in the first and second cords to spin the edible member along the axis. Moving the first sphere portion towards the second sphere portion releases momentum from the generated torque to spin the edible member off-center from the axis.

6 Claims, 4 Drawing Sheets

(56) References Cited

U.S. PATENT DOCUMENTS

| | | | | |
|---|---|---|---|---|
| 5,906,846 | A | * | 5/1999 | Coleman .................. A23G 3/50 |
| | | | | 426/104 |
| 6,050,438 | A | * | 4/2000 | Kovens .................. B65D 11/02 |
| | | | | 220/4.24 |
| 6,332,851 | B1 | * | 12/2001 | Griffin .................... A63B 67/10 |
| | | | | 273/440 |
| 6,644,497 | B1 | * | 11/2003 | Klundt ................... A63H 3/005 |
| | | | | 221/24 |
| D556,390 | S | * | 11/2007 | Greenburgh .................. D11/79 |
| 2003/0152668 | A1 | * | 8/2003 | Griffin ..................... A23G 3/50 |
| | | | | 426/104 |
| 2004/0110446 | A1 | * | 6/2004 | Chow ...................... A63H 1/32 |
| | | | | 446/247 |
| 2008/0171111 | A1 | * | 7/2008 | Matsumoto .............. A23G 3/54 |
| | | | | 426/103 |
| 2009/0285948 | A1 | * | 11/2009 | Tucker .................. A23G 3/563 |
| | | | | 426/104 |
| 2010/0203801 | A1 | * | 8/2010 | Chan ....................... A63H 1/32 |
| | | | | 446/248 |

* cited by examiner

EDIBLE SPINNING DEVICE AND METHOD OF OPERATION

BACKGROUND

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon.

The present invention is directed to an edible spinning device and method of operation that operates in combination of: a spinning toy for entertainment; a container for containing candy or medicine; and an edible component for consumption.

The inventor of the present invention has extensive experience with toys, and especially traditional mechanical toys. The inventor recognized that in the modern world, children are more prone to playing with digital games than with physical products. The inventor realized that he somehow had to again teach a child to play with physical products, for physical products develop coordination and physical skills that a digital game could never offer the child.

He remembered that in his youth he played with a toy that is similar to the toy described in U.S. Pat. No. 2,161,154 that was issued to I. Gertler. A simple toy that allowed children to grasp the extremities of a toy and manipulate the toy so that the toy could spin along a central axis. The toy was manipulated by the child in the manner described in the Gertler patent. The present invention uses at least a portion of the mechanism of the Gertler patent.

The inventor recognized a problem in that the spinning motion of the toy required mechanical energy to operate efficiently. The inventor knew that when a cord was twisted in a first direction, torque and momentum were built up within the cord. And when the cord was released, the momentum forced the cord to twist in an opposite direction.

The inventor decided to use this phenomena to enable a middle portion, including an edible member to move along the length of the cord from extreme ends of the toy. The cord could also be drawn taut or slackened to change the angular and linear velocity of the spinning middle portion and edible member. This manipulation of the cord provided a challenging exercise that enhanced motor skills and provided entertainment.

The inventor recognized another problem in that the toy had to be more alluring for a child, going beyond just a spinning toy. The inventor devised a manner of introducing a physical spinning toy to a child in a manner in which the child would not be led to believe that he was being forced to play with a physical product. The physical product would then serve to increase the child's motor skills. By housing an edible member, such as candy or gum, in the center of the toy and allowing the edible member to spin, the child would be swayed fascinated by the spinning motion and the edible member; thereby causing the child to purchase the toy.

Further, after the edible member is consumed, the inventor believes that the child would eventually use the dispenser as a toy.

For the foregoing reasons, there is an edible spinning device and method of operation provides: a spinning toy for entertainment; a container for containing candy or medicine; and an edible component for consumption.

Spinning toys and candy surprises have been utilized in the past; yet none with the characteristics of the present invention. See U.S. Pat. Nos. 1,804,260; 2,161,154; and 7,531,197.

For the foregoing reasons, there is an edible spinning device and method of operation that is configured into a multi-functional spinning toy, storage container, and edible component. Specifically, the device is configured to operate as: 1) a spinning toy for providing entertainment and developing motor skills; 2) a container for containing a candy and a medicine; and 3) an edible component for consuming a portion of the device.

SUMMARY

The present invention describes an edible spinning device and method of operation that offers multi-functionality, including operation as: a spinning toy for providing entertainment and developing motor skills; a container for containing a candy and a medicine; and an edible component for consuming a portion of the device.

In one embodiment, the edible spinning device provides a simple to operate spinning toy that leverages the torque that is generated from twisting an edible member about a first cord and a second cord, along an axis. As the torque increases, the edible member, which has a weight and a momentum, spins substantially along the axis. However, as the torque is reduced, the edible member spins off-center from the axis, in a generally looping pathway. The angular velocity and the linear velocity of the spinning motion by the edible member may be increased or decreased by manipulating the cord, i.e., draw the cords taut or slacken the cords The edible spinning device comprises an outer sphere having a cavity, which forms a useful container to enable candy and medicine to be stored, carried, filled, and dispensed. The outer sphere can be separated into a first sphere portion and a second sphere portion that are configured to both, come together to form the outer sphere, or separate and work in conjunction with the edible member, a first cord, and a second cord to operate as a spinning toy.

The first sphere portion is defined by a first continuous sidewall and a first edge, which may be beveled. The second sphere portion is defined by a second continuous sidewall and a second edge, which may be beveled.

An edible member is disposed between the first sphere portion and the second sphere portion. The edible member comprises a pair of diametrically opposed depressions. The edible member is edible and may be consumed before or after playing with the device. The edible member also adds weight to the hub, so that the angular velocity and linear velocity increases during operation of the spinning toy. The edible member may include, without limitation, a hard candy, a gum, a chocolate, a medicine, a tablet, and a small toy.

A first cord extends along an axis between the first anchor of the first sphere portion and one of the depressions of the edible member. The first cord is configured to generate torque when twisted in a first direction, and release momentum to reduce torque when twisted in a second direction. Similarly, a second cord extends along the axis between the second anchor of the second sphere portion and one of the depressions of the edible member. The second cord is configured to generate torque when twisted in the first direction, and release momentum to reduce torque when twisted in a second direction.

The first and second cords carry the edible member substantially along the axis and are configured to twist the edible member along the axis. The edible member is also configured to move freely in two directions along the length of the cords towards either spherical portion.

Moving the first sphere portion away from the second sphere portion increases the torque and spins the edible member substantially along the axis. Conversely, moving the first sphere portion towards the second sphere portion releases momentum from the generated torque and spins the edible member off-center from the axis, in a generally looping pathway.

In operation of the device as a container, the outer sphere comprises a cavity for containing a candy, or a medicine, or both. The candy or medicine may be accessed be separating the first sphere portion from the second sphere portion. Additionally, the candy or medicine may be filled into the cavity by separating the outer sphere into its first and second sphere portions.

In operation of the device as a spinning toy, the cord may be manipulated to twist in two directions. As the cord twists in a first direction, torque increases. The twisting action in the first direction creates torque in the cord, which spins the edible member substantially along the axis. Increasing the torque may also spin the edible member lengthwise along the cord, either towards the first sphere portion or towards the second sphere portion.

After twisting in the first direction, momentum gained by the first and second cords and the weight of the edible member force the cords to twist in a second direction; thereby causing release of momentum and decrease of torque. This causes the edible member to spin off-center from the axis, in a generally looping motion.

The angular velocity and the linear velocity of the edible member about the cords may be increased by manipulating the cord to draw the cord taut, or decreased by manipulating the cord to slacken the cord.

In operation of the device as an edible component, the edible member may be consumed upon separating the outer sphere into its first and second sphere sections. The edible member may be consumed before or after playing with the device. It is significant to note that the outer sphere continues operating as a container, and the sphere portions and cords continue operating as a spinning toy until the edible member has been totally consumed.

In one aspect of the present invention, the outer sphere has a spherical shape.

In another aspect, the first sphere portion and the second sphere portion have a generally bowl shape.

In another aspect, the first edge is beveled.

In another aspect, the second edge is beveled and configured to mate with the first beveled edge.

In another aspect, the edible member includes at least one member selected from the group consisting of: a hard candy, a gum, a chocolate, a medicine, a tablet, and a small toy.

In another aspect, the first cord comprises a first sphere end and a first edible member end.

In another aspect, the second cord comprises a second sphere end and a second edible member end.

In another aspect, the first edible member end of the first cord fastens with one of the depressions in the edible member.

In another aspect, second edible member end of the second cord fastens with one of the depressions in the edible member.

In another aspect, the first anchor at the first continuous sidewall includes at least one member selected from the group consisting of: a staple, a screw, an adhesive, a magnet, and a friction-fit mechanism.

In another aspect, the second anchor at the second continuous sidewall includes at least one member selected from the group consisting of: a staple, a screw, an adhesive, a magnet, and a friction-fit mechanism.

In another aspect, the first cord and the second cord are configured to form a continuous loop.

In another aspect, the angular velocity and the linear velocity of the edible member is increased by drawing the cord taut.

In another aspect, the angular velocity and the linear velocity of the edible member is decreased by slackening the cord.

In some embodiments, a method for operating an edible spinning device comprises an initial Step of containing a candy or a medicine in a cavity of an outer sphere. A Step may also include separating the outer sphere into a first sphere portion and a second sphere portion to access the candy or medicine. A further Step comprises extending a first cord along an axis between the first sphere portion and the edible member.

In some embodiments, a Step may include extending a second cord along the axis between the second sphere portion and the edible member. A Step comprises twisting the edible member in a first direction to generate torque in the first cord and the second cord. A further Step includes moving the first sphere portion away from the second sphere portion to increase the torque and spin the edible member substantially along the axis. Another Step may include moving the first sphere portion towards the second sphere portion to release momentum from the generated torque and spin the edible member off-center from the axis. A final Step comprises consuming the edible member.

One objective of the present invention is to provide an entertaining spinning toy that is at least partially edible.

Another objective of the present invention is to provide an outer sphere that contains candy or medicine.

Another objective of the present invention is to regulate access to the candy or medicine through at least one gate.

Yet another objective of the present invention is to generate sufficient torque on a cord, such that the hub, the edible member, and the middle sphere portion are rotatably carried to the first sphere portion or the second sphere portion.

Yet another objective is to release momentum from the generated torque, such that the hub, the edible member, and the middle sphere portion ae rotatably carried towards the second sphere portion.

Yet another objective is to consume the edible member either after or before playing with the device.

Yet another objective is to enable the cord to be manipulated so that the angular velocity and linear velocity of the hub, the edible member, and the middle sphere portion are increased or decreased.

Yet another objective of the present invention is to provide a candy or pill dispenser that converts into a toy after the candy or pill is consumed.

Another objective of the present invention is to provide a physical toy to a child that will allow the child to improve his or her motor skills.

Yet another objective of the present invention is to provide a child with a non-digital toy or game.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

DRAWINGS

These and other features, aspects, and advantages of the present invention will become better understood with regard to the following description, appended claims, and drawings where:

DESCRIPTION

Figure 1:
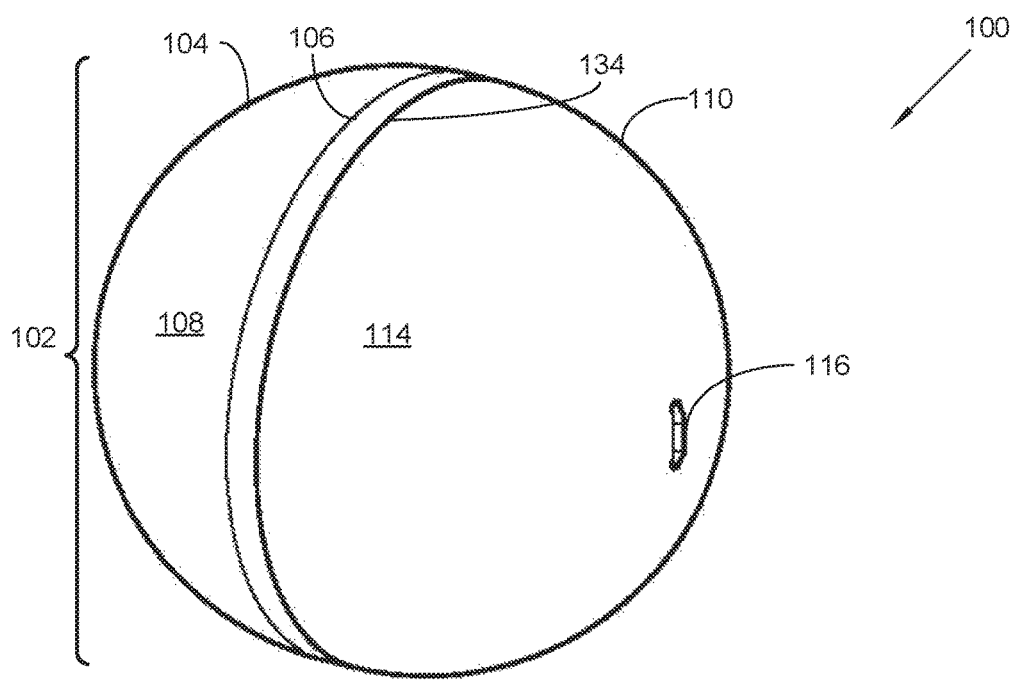
FIG. 1 is a perspective view of an exemplary edible spinning device, showing an outer sphere.

The present invention is directed to an edible spinning device 100 and method 200 of operation, as referenced in FIGS. 1-7. The edible spinning device 100, hereafter "device 100" is configured into a multi-functional spinning toy, storage container, and edible component. Specifically, the device 100 is configured to operate as: 1) a spinning toy for providing entertainment and developing motor skills; 2) a container for containing a candy and a medicine 132; and 3) an edible component for consuming a portion of the device 100.

The device 100, as utilized as a toy, provides a simple to operate spinning toy that leverages the torque that is generated from twisting an edible member about a first cord 122 and a second cord 128, along an axis 136. As the torque increases, the edible member 118, which has a weight and a momentum, spins substantially along the axis 136. However, as the torque is reduced, the edible member 118 spins off-center from the axis 136, in a generally looping pathway.

The angular velocity and the linear velocity of the spinning motion by the edible member 118 may be increased or decreased by manipulating the cord, i.e., draw the cords taut or slacken the cords. This manipulation of the cords helps develop motor skills and also provides entertainment.

As shown in FIG. 1, the device 100, as used as a container, provides an outer sphere 102 that securely and safely contains candy and medicine for storage, portability, refilling, and dispensing. The candy and medicine may be filled and dispensed by disassembling the outer sphere 102 into a first sphere portion 104 and a second sphere portion 110.

The device 100, as used for consumption, also includes an edible member 118 that is contained inside the outer sphere 102. The edible member 118 may be consumed either before or after playing with the device 100. The edible member 118 may also be effective for providing weight to increase the velocity of the spinning. Suitable materials for the device 100 may include, without limitation, a rigid polymer, polyurethane, a metal, wood, and fiberglass.

Figure 2:
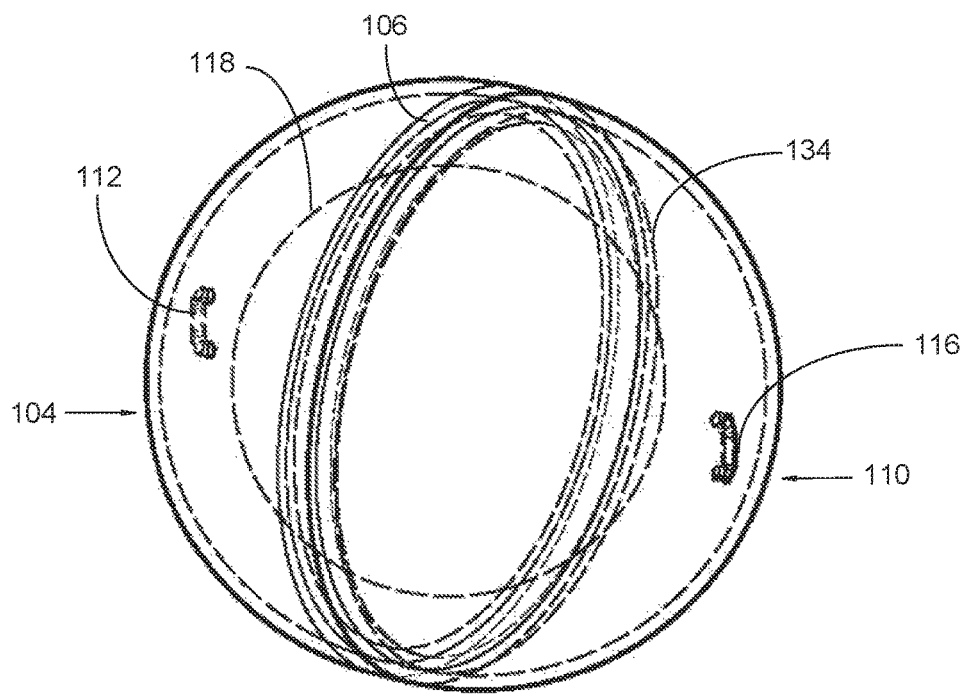
FIG. 2 is a sectioned view of the edible spinning device shown in FIG. 1, showing an outer sphere.

As referenced in FIG. 2, the device 100 comprises an outer sphere 102 having a cavity 116, which forms a useful container to enable candy and medicine to be stored, carried, filled, and dispensed. The outer sphere 102 may have a generally spherical shape. Though in other embodiments, other shapes may be used. The outer sphere 102 can be separated into a first sphere portion 104 and a second sphere portion 110 that are configured to both, come together to form the outer sphere 102; or separate and work in conjunction with the edible member 118, a first cord 122, and a second cord 128 to operate as a spinning toy.

Figure 3:
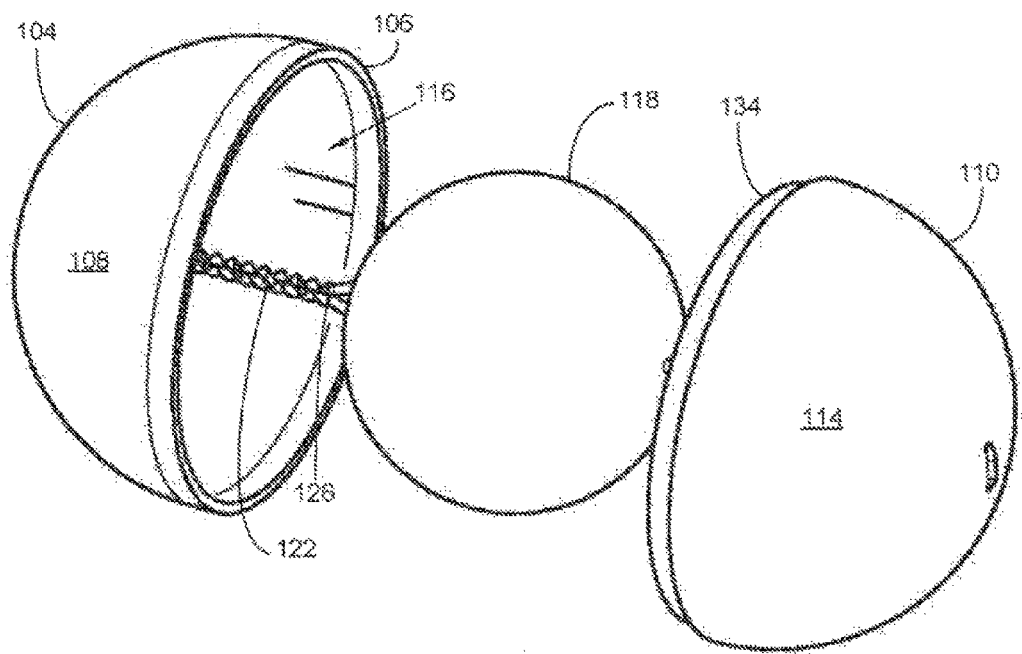
FIG. 3 is a perspective view of a first sphere portion separating from a second sphere portion from the edible spinning device shown in FIG. 1.

Turning now to FIG. 3, the first sphere portion 104 is defined by a first continuous sidewall 108 and a first edge 106, which may be beveled. A first anchor 112 is disposed concentrically on the first continuous sidewall 108. The second sphere portion 110 is defined by a second continuous sidewall 114 and a second edge 134, which may also be beveled. A second anchor 116 is disposed concentrically on the second continuous sidewall 114.

Figure 4:
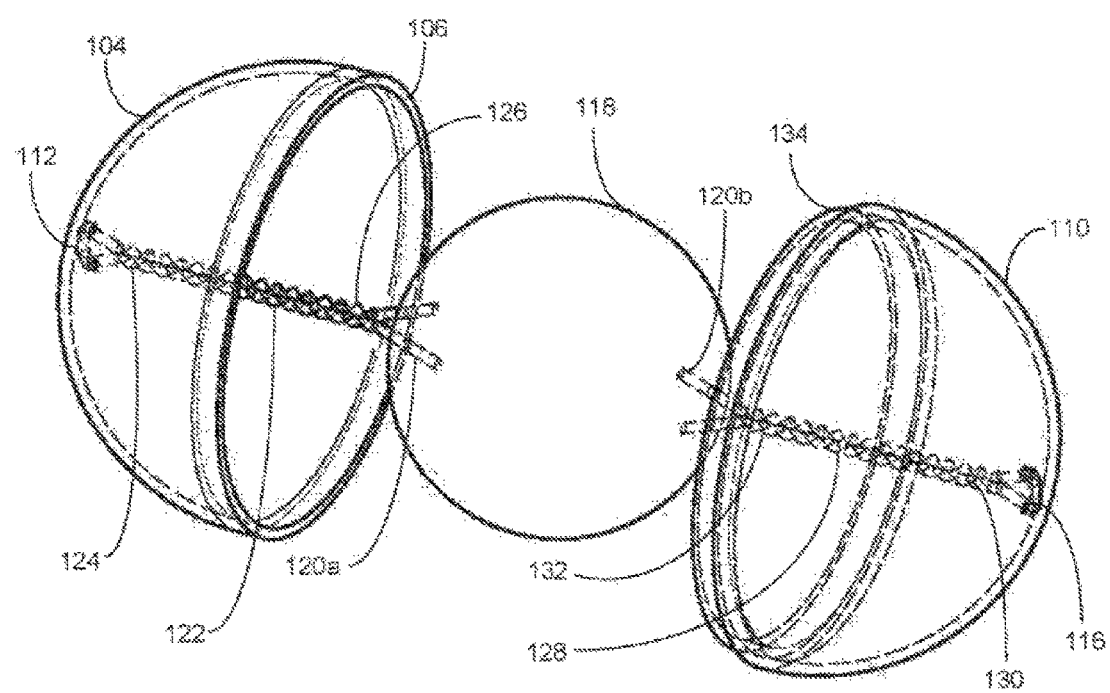
FIG. 4 is a sectioned view of a first sphere portion separating from a second sphere portion from the edible spinning device shown in FIG. 1.

As FIG. 4 illustrates, the beveled edges of the first and second sphere portions 104, 110 mate to from the outer sphere 102. The sphere portions 104, 110 may have beveled edges to facilitate connections therebetween. For example, the first continuous sidewall 108 has a first beveled edge and the second continuous sidewall 114 has a second beveled edge that is configured to mate in a snap-fit engagement. Though in other embodiments, the edges 106, 134 mate through adhesives, magnets, and suction mechanisms.

In some embodiments, the first sphere portion 104 and the second sphere portion 110 may have a generally bowl shape. Though in other embodiments, the sphere portions 104, 110 may be shaped in other sizes and dimensions. In some embodiments, each sphere portion 104, 110 may have a different color or pattern to provide greater entertainment value.

An edible member 118 is disposed between the first sphere portion 104 and the second sphere portion 110. The edible member 118 comprises a pair of diametrically opposed depressions 120a, 120b. The depressions 120a, 120b are configured to receive and anchor a first cord 122 and a second cord 128, as described below. The depressions 120a, 120b are positioned oppositely from each other, so as to form an axis 136 that is defined as extending a straight line between the first and second spheres 104, 110, and through the edible member 118.

The edible member 118 is edible and may be consumed before or after playing with the device 100. The edible member 118 may be chewed or licked for consumption. The edible member 118 also adds weight to the cords 122, 128, so that the angular velocity and linear velocity increases during spinning. The edible member 118 may include, without limitation, a hard candy, a gum, a chocolate, a medicine, a tablet, and a small toy.

Figure 5:
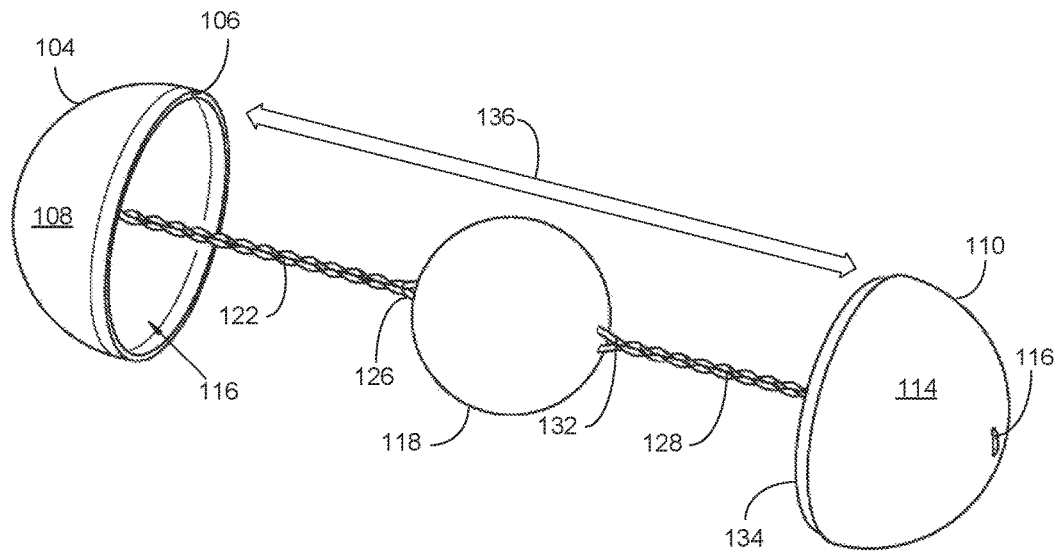
FIG. 5 is a perspective view of an edible member spinning along an axis about a first cord and a second cord from the edible spinning device shown in FIG. 1.

Looking now at FIG. 5, a first cord 122 extends along an axis 136 between the first anchor 112 of the first sphere portion 104 and one of the depressions 120a of the edible member 118. The first cord 122 is defined by a first sphere end 124 and a first edible member end 126. The first sphere end 124 of the first cord 122 may fasten securely to the first anchor 112 of the first continuous sidewall 108, or other fastening mechanism known in the art. The first edible member end 126 of the first cord 122 may fasten securely to one of the depressions 120*a* in the edible member 118. The first cord 122 is configured to generate torque when twisted in a first direction, and release momentum to reduce torque when twisted in a second direction.

Similarly, a second cord 128 extends along the axis 136 between the second anchor 116 of the second sphere portion 110 and one of the depressions 120*b* of the edible member 118. The second cord 128 is defined by a second sphere end 130 and a second edible member end 132. The second sphere end 130 of the second cord 128 may fasten securely to the second anchor 116 of the second continuous sidewall 114, or other fastening mechanism known in the art. The second edible member end 132 of the second cord 128 may fasten securely to one of the depressions 120*b* in the edible member 118. The second cord 128 is configured to generate torque when twisted in the first direction, and release momentum to reduce torque when twisted in a second direction.

Figure 6:
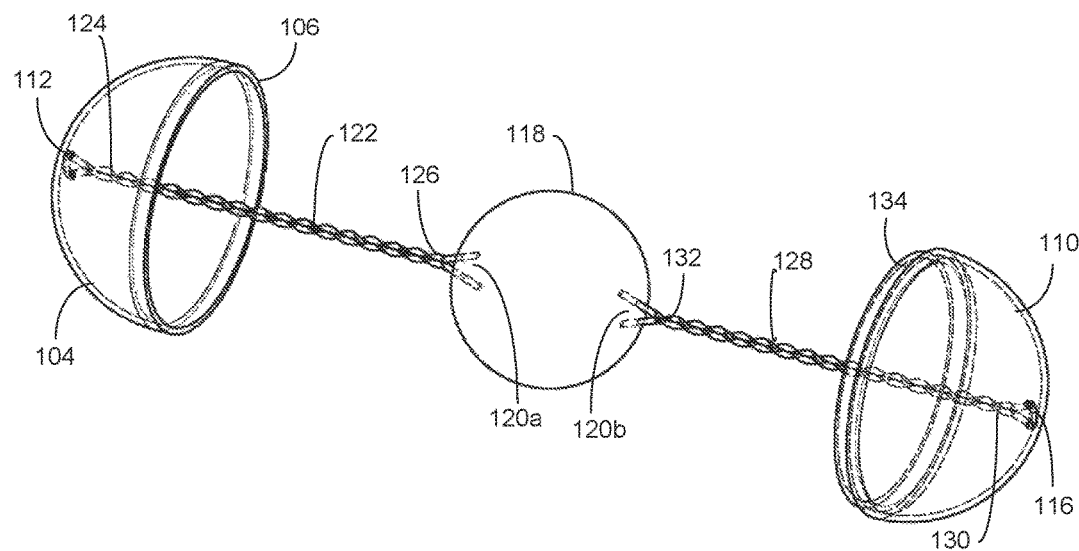
FIG. 6 is a sectioned view of an edible member spinning along an axis about a first cord and a second cord from the edible spinning device shown in FIG. 1.

As FIG. 6 shows, the first and second cords 122, 128 carry the edible member 118 substantially along the axis 136 and are configured to twist the edible member 118 along the axis 136. The edible member 118 is also configured to move freely in two directions along the length of the cords 122, 128 towards either spherical portion 104, 110. Suitable materials for the cords 122, 128 may include, without limitation, a fiber, rubber, polyester, bamboo, and a polymer.

The cords 122, 128 twist in a first direction so as to generate torque and gain momentum. The momentum on the cords is released when the edible member spins in the second direction. The cords 122, 128 may be manipulated to alter the velocity of the spinning. Thus, moving the first sphere portion 104 away from the second sphere portion 110 increases the torque and spins the edible member 118 substantially along the axis 136. Conversely, moving the first sphere portion 104 towards the second sphere portion 110 releases momentum from the generated torque and spins the edible member 118 off-center from the axis 136.

It is significant to note that when the cords 122, 128 are configured into a continuous loop configuration, the twisting action between the two parallel sections of cords 122, 128 generates greater torque and increase momentum more significantly than when a single strand of cord is used.

In operation of the device 100 as a container (FIG. 1), the outer sphere 102 comprises a cavity 116 for securely containing a candy, or a medicine, or both. The candy or medicine may be accessed by separating the first sphere portion 104 from the second sphere portion 110. Additionally, the candy or medicine may be filled into the cavity 116 by separating the outer sphere 102 into its first and second sphere portions 104, 110.

In operation of the device 100 as a spinning toy (FIG. 5), the cords 122, 128 may be manipulated to twist in two directions. As the cords 122, 128 twist in a first direction, torque increases. The twisting action in the first direction creates torque in the cords 122, 128, which spins the edible member substantially along the axis 136. The torque is increased by pulling the first spherical portion 104 away from the second spherical portion 110. Increasing the torque may also spin the edible member 118 lengthwise along the cords 122, 128, either towards the first sphere portion 104 or towards the second sphere portion 110.

After twisting in the first direction, momentum gained by the first and second cords 122, 128 and the weight of the edible member 118 may force the cords 122, 128 to twist in a second direction; thereby causing release of momentum and decrease of torque. Conversely, moving the first spherical portion 104 towards the second spherical portion 110 releases momentum and reduces torque. This causes the edible member 118 to spin off-center from the axis 136, in a generally looping motion.

The angular velocity and the linear velocity of the edible member 118 about the cords 122, 128 may be increased by manipulating the cords 122, 128 to draw the cords 122, 128 taut, or decreased by manipulating the cords 122, 128 to slacken the cords 122, 128.

In operation of the device 100 as an edible component, the edible member 118 may be consumed upon separating the outer sphere 102 into its sphere sections 104, 110. The edible member 118 may be consumed before or after playing with the device 100. It is significant to note that the outer sphere 102 continues operating as a container, and the sphere portions 104, 110 and cords 122, 128 continue operating as a spinning toy until the edible member 118 has been totally consumed.

Figure 7:
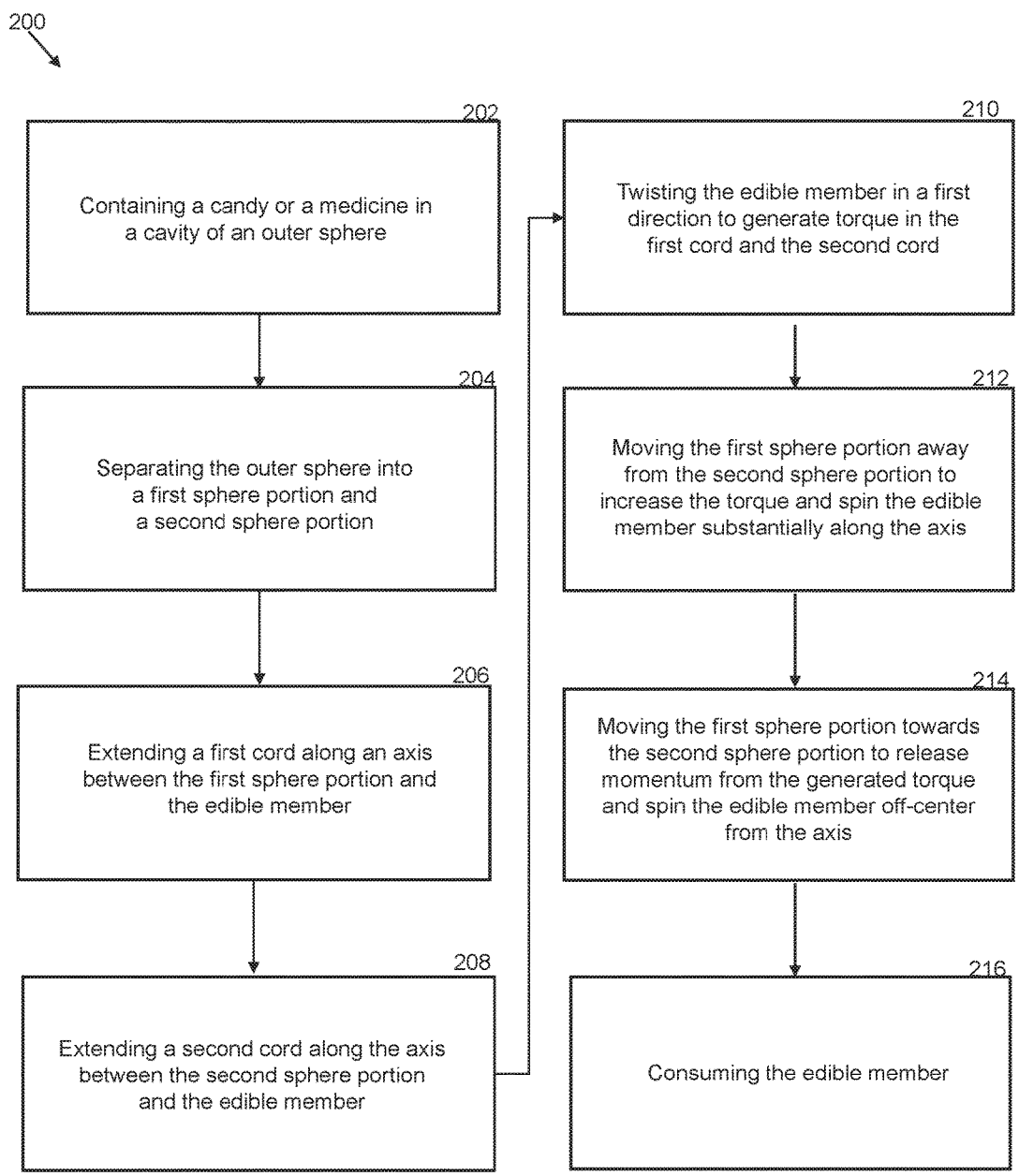
FIG. 7 is a flowchart of an exemplary method for operating an edible spinning device.

As the flowchart of FIG. 7 references, a method 200 for operating an edible spinning device 100 enables the utilization of an edible spinning device 100 that functions as: a spinning toy for entertainment; a container for containing candy or medicine 132; and an edible component for consumption. The method 200 comprises an initial Step 202 of containing a candy or a medicine in a cavity 116 of an outer sphere 102. The device 100, as used as a container, provides an outer sphere 102 that securely and safely contains candy and medicine for storage, portability, refilling, and dispensing.

A Step 204 may also include separating the outer sphere 102 into a first sphere portion 104 and a second sphere portion 110 to access the candy or medicine. The first sphere portion 104 is defined by a first continuous sidewall 108 and a first edge 106, which may be beveled. A first anchor 112 is disposed concentrically on the first continuous sidewall 108. The second sphere portion 110 is defined by a second continuous sidewall 114 and a second edge 134, which may also be beveled. A second anchor 116 is disposed concentrically on the second continuous sidewall 114.

A further Step 206 comprises extending a first cord 122 along an axis 136 between the first sphere portion 104 and the edible member 110. The first cord 122 extends along an axis 136 between the first anchor 112 of the first sphere portion 104 and one of the depressions 120*a* of the edible member 118. The first cord 122 is defined by a first sphere end 124 and a first edible member end 126. The first sphere end 124 of the first cord 122 may fasten securely to the first anchor 112 of the first continuous sidewall 108, or other fastening mechanism known in the art. The first edible member end 126 of the first cord 122 may fasten securely to one of the depressions 120*a* in the edible member 118.

In some embodiments, a Step 208 may include extending a second cord 128 along the axis 136 between the second sphere portion and the edible member. The second cord 128 extends along the axis 136 between the second anchor 116 of the second sphere portion 110 and one of the depressions 120*b* of the edible member 118. The second cord 128 is defined by a second sphere end 130 and a second edible member end 132. The second sphere end 130 of the second cord 128 may fasten securely to the second anchor 116 of the second continuous sidewall 114, or other fastening mechanism known in the art. The second edible member end 132 of the second cord 128 may fasten securely to one of the depressions 120*b* in the edible member 118.

A Step 210 comprises twisting the edible member 118 in a first direction to generate torque in the first cord 122 and the second cord 128. As the cords 122, 128 twist in a first direction, torque increases. The twisting action in the first direction creates torque in the cords 122, 128, which spins the edible member substantially along the axis 136.

A further Step 212 includes moving the first sphere portion 104 away from the second sphere portion 110 to increase the torque and spin the edible member 118 substantially along the axis 136. The torque is increased by pulling the first spherical portion 104 away from the second spherical portion 110. Increasing the torque may also spin the edible member 118 lengthwise along the cords 122, 128, either towards the first sphere portion 104 or towards the second sphere portion 110.

Another Step 214 may include moving the first sphere portion 104 towards the second sphere portion 110 to release momentum from the generated torque and spin the edible member 118 off-center from the axis 136. After twisting in the first direction, momentum gained by the first and second cords 122, 128 and the weight of the edible member 118 may force the cords 122, 128 to twist in a second direction; thereby causing release of momentum and decrease of torque. Conversely, moving the first spherical portion 104 towards the second spherical portion 110 releases momentum and reduces torque. This causes the edible member 118 to spin off-center from the axis 136, in a generally looping motion. A Step 216 comprises consuming the edible member 118.

While the inventor's above description contains many specificities, these should not be construed as limitations on the scope, but rather as an exemplification of several preferred embodiments thereof. Many other variations are possible. For example, the device may utilize two edible members adjacent to each other and connected by a third cord. Accordingly, the scope should be determined not by the embodiments illustrated, but by the appended claims and their legal equivalents.

What is claimed is:

1. An edible spinning device, the device comprising:
   an outer sphere defined by a cavity, the outer sphere configured to separate into a first sphere portion and a second sphere portion, the first sphere portion defined by a first edge and a first continuous sidewall having a first anchor, the second sphere portion defined by a second edge and a second continuous sidewall having a second anchor;
   an edible member disposed between the first sphere portion and the second sphere portion, the edible member comprising a pair of diametrically opposed depressions, the edible member configured to be edible and the edible member has a weight that allows it to serve as a center of gravity of the edible spinning device;
   a first cord configured to extend along an axis between the first anchor of the first sphere portion and one of the depressions of the edible member, the first cord configured to generate torque when twisted in a first direction; and
   a second cord configured to extend along the axis between the second anchor of the second sphere portion and one of the depressions of the edible member, the second cord configured to generate torque when twisted in the first direction,
   whereby moving the first sphere portion away from the second sphere portion increases the torque and spins the edible member substantially along the axis, whereby moving the first sphere portion towards the second sphere portion releases momentum from the generated torque and spins the edible member off-center from the axis, and wherein the edible member upon being consumed ceases to be an integral part of the edible spinning device, for the edible member serves as a connecter between the first sphere portion and the second sphere portion via the first and second cord and therefore the edible spinning device ceases to function as a spinning device when eaten, and wherein the first sphere portion and the second sphere portion serve to house the edible member during consumption after the edible member has been initially tasted or sampled.

2. The device of claim 1, wherein the first edge is beveled, and wherein the second edge is beveled, and the first beveled edge is configured to mate with the second beveled edge.

3. The device of claim 1, wherein the edible member is a a hard candy.

4. The device of claim 1, wherein the first cord and the second cord are configured to form a continuous loop.

5. The device of claim 1, wherein the angular velocity and the linear velocity of the edible member is increased by drawing the cord taut.

6. The device of claim 1, wherein the angular velocity and the linear velocity of the edible member is decreased by slackening the cord.

* * * * *